Dec. 18, 1951     J. W. HUFF     2,578,885
BELT FOR CONE PULLEYS
Filed Dec. 31, 1946
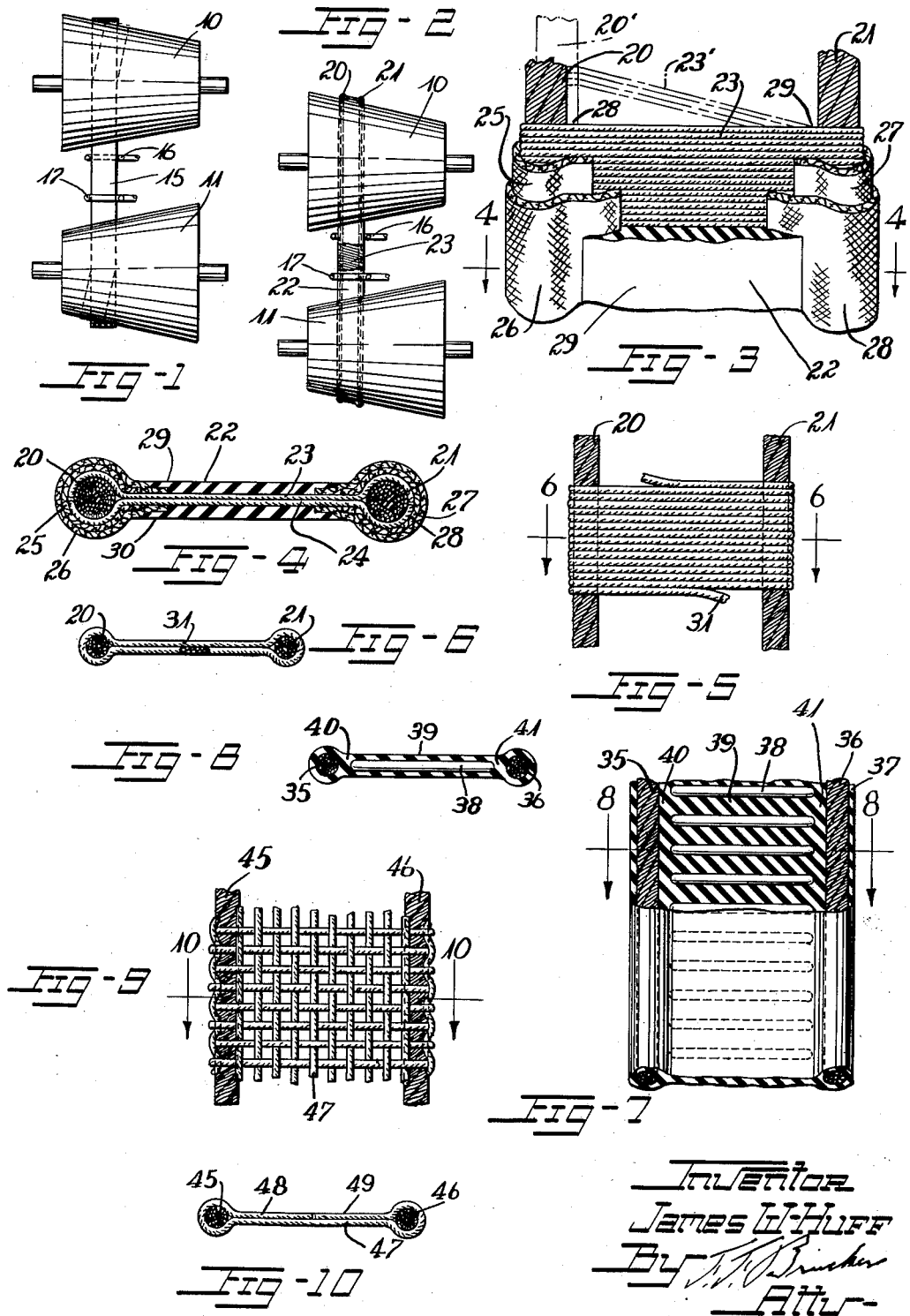

Patented Dec. 18, 1951

2,578,885

UNITED STATES PATENT OFFICE 2,578,885

BELT FOR CONE PULLEYS

James W. Huff, Akron, Ohio, assignor to The B. F. Goodrich Company, New York, N. Y., a corporation of New York Application December 31, 1946, Serial No. 719,461

7 Claims. (Cl. 74—231)

This invention relates to endless transmission belts and is especially useful in the transmission of power between oppositely tapered cone pulleys.

In speed changers or cone pulley drives having a pair of oppositely tapered cone pulleys and a belt encompassing the pair of pulleys great difficulties have been encountered in that where more than line contact of the belt with the pulleys has been attempted differential driving of laterally spaced circumferential zones of the belt has occurred and consequent slippage and wear of the belt has been experienced.

Furthermore the presence of shifter forks necessary to control the position of the belt together with the tendency of the belt to climb the cones has necessitated high resistance to wear of the belt with consequent low stretchability thereof.

It is an object of the present invention to overcome the foregoing and other difficulties.

Other objects are to provide a belt having contact with the cone pulleys at both margins, to provide a belt having low resistance to differential advance of its margins relative to each other on the cone pulleys while providing high lateral strength, and to provide high resistance of its margins to shifter fork wear without substantial sacrifice of distortability.

These and other objects will appear from the following description and the accompanying drawings.

Of the drawings:

Fig. 1 is a view showing a pair of cone pulleys and a flat belt mounted thereon, the dot and dash lines indicating the position the belt would have to assume to provide contact across its face, the shifters being also shown as partly broken away, Fig. 2 is a similar view showing a belt constructed in accordance with and embodying the invention mounted on the same pulleys, Fig. 3 is a plan view of a portion thereof, parts being broken away in steps and illustrating by the dot and dash lines possible shifting of the elements, Fig. 4 is a cross-sectional view thereof, Fig. 5 is a detail view showing the longitudinal and cross members without the fabric and rubber portions, Fig. 6 is a cross-sectional view thereof, Fig. 7 is a plan view of a further embodiment of the invention, Fig. 8 is a cross-sectional view thereof, Fig. 9 is a plan view of another embodiment of the invention, and Fig. 10 is a cross-sectional view thereof.

Referring to the drawings, and first to Figs. 1 and 2, thereof, the numerals 10, 11 designate oppositely inclined cone pulleys having parallel axes. In Fig. 1, a flat endless belt 15 is trained about the pulleys and between shifter forks 16, 17 which engage about its opposite straight reaches to guide it to the desired positions with respect to the pulleys, the forks being shiftable by means not shown along the faces of the pulleys to change the speed ratio of the shafts on which the pulleys are mounted. It will be seen that the belt if rather stiff would take the full line position in which it would contact with pulley 10 at one margin only and with pulley 11 at the other margin only. Due however to the fact that the belt is somewhat flexible even in an edgewise direction, the belt will flex edgewise under its tension and tend to assume a position indicated in dot-and-dash lines. This tendency will be overcome somewhat by the tendency of the belt during operation to climb the cones and assume the full line position so that margin to margin contact of the belt and pulley will never be obtained. As the belt contacts the surface over some narrower width with decreasing pressure between belt and pulley from the margin of contact toward the opposite margin and change of surface speed laterally of the cone over the surface of contact, rapid wear due to scuffing will occur at the center of the belt face. At the same time, the tendency of the belt to climb the pulleys causes rapid wear of the margins of the belt by contact with the shifting forks.

Now referring to Fig. 2, the same cone pulleys and shifter forks are illustrated with a belt constructed in accordance with and embodying applicant's invention. The belt has substantially inextensible but flexible tension members 20, 21 at its opposite side margins, and these are connected by a web portion 22 therebetween having low resistance to racking action incident to circumferential advance of one of the tension members with relation to the other in accommodation of the belt to the slope of the cones. Cross elements 23 of substantially non-extensible material are arranged in the web portion and extend from one tension member to the other, to which they are secured, to prevent undesirable lateral spreading of the belt.

This action of the belt may be understood from Fig. 3 where the flexible tension members 20, 21 of cord, cable, or other construction providing low extensibility, are held in laterally spaced apart relation by cross elements 23 resembling ladder rungs which are connected to the tension members 20, 21 by hinged connections 28, 29 along the tension members. As indicated by the dot and dash lines, the tension member 20 is substantially free to advance as to the position 20' with relation to the tension member 21 with a consequent narrowing of the belt as indicated by movement about the hinged connection 29 to the position 23'. Such racking movement of the ladder-like belt permits its accommodation to the tapered cones as shown in Fig. 2 so that contact of both tension members with the cone is accomplished.

In this form of the invention as shown in Figs. 3 and 4, the spaced-apart tension members 20, 21 are preferably of cable or cord construction and may be in the form of endless grommets twisted from rubber impregnated cord. To prevent undesirable spreading of the belt by separation of the tension members laterally, two layers 23, 24 of weftless cord fabric or weak-wefted cord fabric are provided to supply the cross elements of the web 22. These are arranged one at each face of the belt and extend from one tension member to the other with their cords extending substantially perpendicular to the tension members and their ends extending substantially half way about the tension members. The faces of the cord material between the tension members are adhered to each other by the rubber-like material to provide a web of cords preventing separation of the tension members but permitting racking or biasing of the belt to accommodate it to the shape of the pulleys by advance of one tension member relative to the other.

To provide good abrasion resistance to the margins of the belt which contact the pulleys and the shifter forks, and to assist in anchoring the cross cord members to the tension members, strips 25, 26, 27, 28 of bias cut square woven fabric are provided about the ends of the cords and extending over the margins of the cord web between the tension members and are adhered thereto by rubber coatings on the fabric strips and the cords to provide a sheath thereabout.

For stiffening and protecting the cord web portion, layers 29, 30 of resilient rubber or other rubber-like material extend over the web portion and over the margins of the fabric strips. All parts of the belt are vulcanized to each other to permanently unit them in a body of rubber-like material.

As shown in Figs. 5 and 6 the tension members 20, 21 may be held in spaced apart relation by a continuous winding of rubberized cord 31 wound thereabout in convolutions and pressed upon itself between the tension members to provide the cross elements of the web 22 extending therebetween. The arrangement of the web of parallel cords permits racking or biasing of the belt by advance of one tension member with relation to the other to accommodate the belt to the tapered form of the pulleys.

In the embodiment of Figs. 7 and 8, the parallel tension members 35, 36 are secured in spaced-apart relation by a body 37 of soft vulcanized rubber composition or other rubber-like material. Between the tension members, cross members or ladder rungs 38 of stiff material such as wires or rods of metal or plastic are embedded in a web portion 39 of the body and resist lateral compression of the belt. The cross members have their ends preferably spaced apart from the tension members 35, 36 by the rubber-like material as at 40, 41 thereby providing hinge zones adjacent the tension elements which together with the rubber-like material 39 of the web between the cross-members permits a racking or biasing distortion of the belt providing accommodation of the belt to the cone pulleys.

In the form of the invention shown in Figs. 9 and 10, tension members 45, 46 of flexible cord or cable are held in spaced apart relation by open-meshed straight laid rubberized fabric 47 having its lateral margins 48, 49 folded thereabout. The entire assembly is preferably enclosed by rubber-like material which fills the interstices of the fabric but due to distortability of the rubber-like material and the open weave of the fabric racking or biasing action may take place to permit advance of one tension member with relation to the other. The fabric resists lateral spreading of the tension members and with the rubber-like material provides sufficient lateral resistance to compression while the flexibility of the cross threads of the fabric provides hinging thereof laterally adjacent the tension members.

In each of the embodiments of the invention, simultaneous engagement of each margin of the belt with each of the pulleys is made possible by the ability of the tension members to shift circumferentially with respect to each other due to the construction of the web therebetween which is adapted to racking or biasing action.

In each embodiment of the invention, the tension members may be in the form of endless grommets of tension resisting material such as cotton, rayon or nylon cord or metallic wire or combinations of textile material and wire.

Variations may be made without departing from the scope of the invention as it is defined by the following claims.

I claim:

1. A transmission belt for cone pulleys, said belt comprising a body of rubber-like material, flexible substantially inextensible tension elements disposed therethrough in a direction longitudinal of the belt and in laterally spaced-apart relation, and cross elements in said body extending between said tension elements and mounted crosswise of the belt for swinging movement with relation to the tension elements, said cross elements being secured to each other between said tension elements only by resilient rubber-like material providing low resistance to racking action to permit longitudinal movement of said tension elements one with relation to another during operation of the belt to maintain conformance with the surfaces of the cone pulleys.

2. A transmission belt for cone pulleys, said belt comprising a body of rubber-like material, flexible substantially inextensible tension cord elements disposed therethrough in a direction longitudinal of the belt and in laterally spaced-apart parallel relation, and cross elements of parallel cords in said body disposed between said tension elements and mounted crosswise of the belt in adhered relation to said rubber-like material for swinging movement with relation to said tension elements said cross elements being secured to each other between said tension elements only by resilient rubber-like material providing low resistance to racking action to permit longitudinal movement of said tension elements one with relation to another during operation of the belt to maintain conformance with the surfaces of the cone pulleys.

3. A transmission belt for cone pulleys, said belt comprising a body of rubber-like material, flexible substantially inextensible tension elements disposed therethrough in a direction longitudinal of the belt and in laterally spaced-apart parallel relation, and cross elements of parallel cords in said body disposed between said tension elements and mounted crosswise of the belt for swinging movement with relation to said tension elements to permit longitudinal movement of said tension elements one with relation to another during operation of the belt to main conformance with the surfaces of the cone pulleys, said cords comprising straight reaches of a wrapping of cord encompassing said tension elements and being united to each other between the tension elements only by said rubber-like material.

4. A transmission belt for cone pulleys, said belt comprising a body of rubber-like material, flexible substantially inextensible tension elements disposed therethrough in a direction longitudinal of the belt and in laterally spaced-apart parallel relation, and cross elements of parallel cords in said body disposed between said tension elements and mounted cross-wise of the belt for swinging movement with relation to said tension elements to permit longitudinal movement of said tension elements one with relation to another during operation of the belt to maintain conformance with the surfaces of the cone pulleys, and a sheath of wear resisting material enclosing a margin of the belt and providing resistance to abrasion.

5. A transmission belt for cone pulleys, said belt comprising a body of rubber-like material, flexible substantially inextensible tension elements disposed therethrough in a direction longitudinal of the belt and in laterally spaced-apart parallel relation, and cross elements of parallel cords in said body disposed between said tension elements and mounted cross-wise of the belt for swinging movement with relation to said tension elements to permit longitudinal movement of said tension elements one with relation to another during operation of the belt to maintain conformance with the surfaces of the cone pulleys, and a sheath of wear resisting bias cut square woven fabric enclosing a margin of the belt and providing resistance to abrasion.

6. A transmission belt for cone pulleys, said belt comprising a body of rubber-like material, flexible substantially inextensible tension elements disposed therethrough in a direction longitudinal of the belt and in laterally spaced apart parallel relation, each tension element being at a margin of the belt, and layers of parallel cord material at opposite faces of the tension elements and disposed therebetween with cord elements thereof extending cross-wise of the belt, said cord material being secured to said tension elements at the ends of the cords, the cord elements between the tension elements being mounted for swinging movement with relation to said tension elements by rubber-like material to permit longitudinal movement of said tension elements one with relation to another during operation of the belt to maintain conformance with the surfaces of the cone pulleys.

7. A transmission belt for cone pulleys, said belt comprising a body of rubber-like material, flexible substantially inextensible tension elements disposed therethrough in a direction longitudinal of the belt and in laterally spaced apart parallel relation, each tension element being at a margin of the belt, and layers of parallel cord material at opposite faces of the tension elements and disposed therebetween with cord elements thereof extending cross-wise of the belt, said cord material being adhered to said tension elements, the cord elements between the tension elements being mounted for swinging movement with relation to said tension elements one with relation to another during operation of the belt to maintain conformance with the surfaces of the cone pulleys, and a sheath of wear resisting fabric enclosing a margin of the assembly including a tension element and providing resistance to abrasion.

JAMES W. HUFF.

REFERENCES CITED

The following references are of record in the file of this patent:

UNITED STATES PATENTS

| Number | Name | Date |
|---|---|---|
| 1,001,823 | Desmolieres | Aug. 29, 1911 |
| 1,204,816 | Pattee | Nov. 14, 1916 |
| 1,285,465 | Tewksbury | Nov. 19, 1918 |
| 1,420,962 | Breuer | June 27, 1922 |

FOREIGN PATENTS

| Number | Country | Date |
|---|---|---|
| 314,091 | Germany | 1916 |